Patented May 31, 1927.

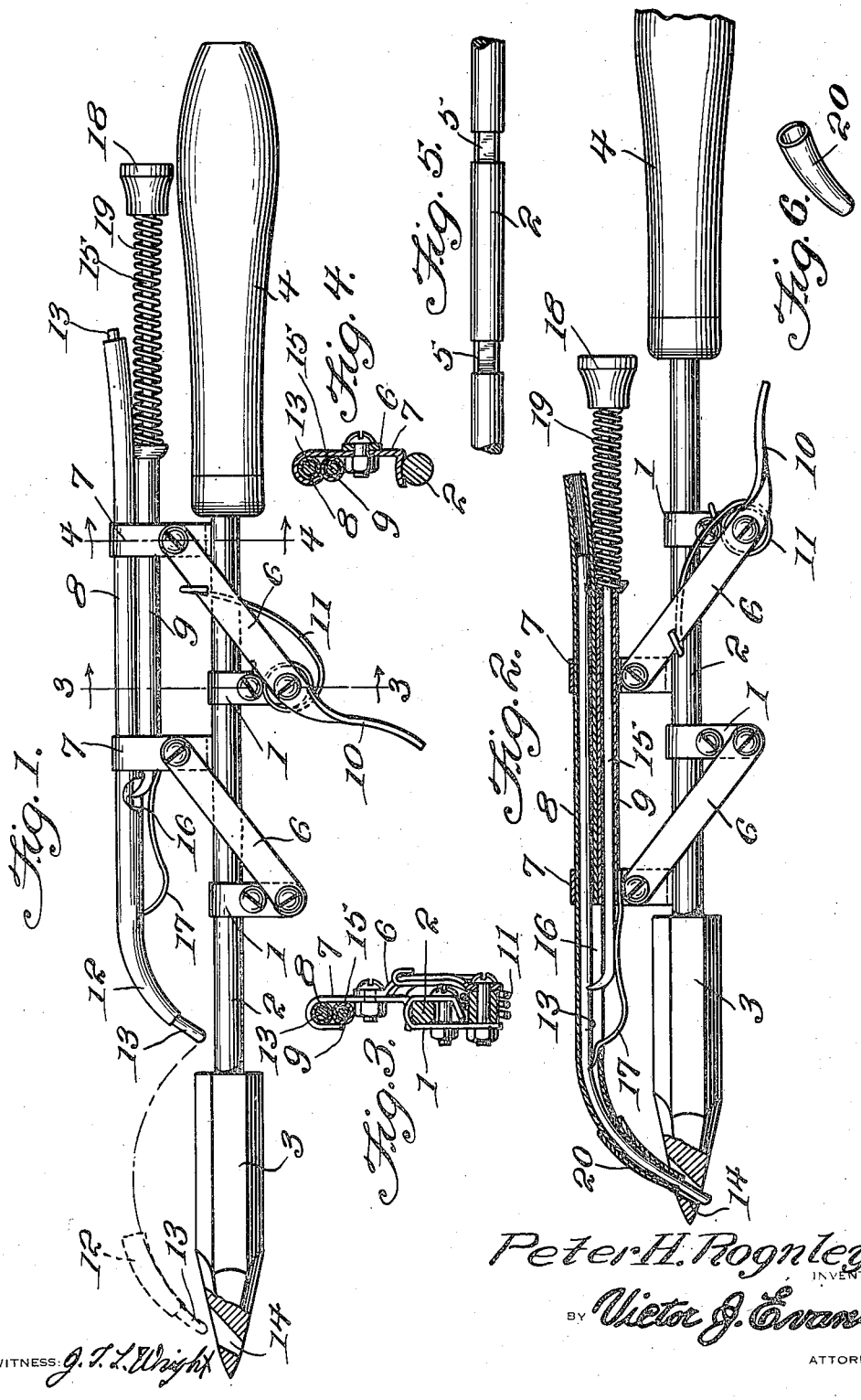

1,631,063

UNITED STATES PATENT OFFICE.

PETER H. ROGNLEY, OF WASHINGTON, DISTRICT OF COLUMBIA.

SOLDERING IRON.

Application filed June 4, 1926. Serial No. 113,765.

This invention relates to improvements in soldering irons, the general object of the invention being to provide means for feeding a strip of solder to the iron by means of a hand-actuated member, with means for holding the solder normally away from the iron so that it will not be affected by the heat therefrom.

Another object of the invention is to provide trigger means for moving the strip-carrying member and its associated parts forwardly to place the solder on the iron.

A further object of the invention is to provide a detachable member for permitting the solder to be fed upwardly against the under side of an object without the solder dropping off the iron.

This invention also consists in certain other features of construction and in the combination and arrangement of the several parts, to be hereinafter fully described, illustrated in the accompanying drawings, and specifically pointed out in the appended claims.

In describing my invention in detail, reference will be had to the accompanying drawings wherein like characters denote like or corresponding parts throughout the several views, and in which:—

Fig. 1 is a side view, with parts broken away, showing the invention in use on an iron;

Fig. 2 is a sectional view showing the parts moved forwardly to place the solder on the under side of the iron;

Fig. 3 is a section on line 3—3 of Fig. 1;

Fig. 4 is a section on line 4—4 of Fig. 1;

Fig. 5 is a fragmentary view of portion of the stem of the iron showing the cutaway portions therein for receiving the supporting clamps of the device; and Fig. 6 is a view of the extension nozzle.

In these views, 1 indicates a pair of embracing brackets placed on the stem 2 of the soldering iron, the iron of which is shown at 3 and the handle at 4. The stem is cut away to provide reduced portions, as shown at 5, which have square faces to receive the brackets. A link 6 is pivoted to a part of each bracket and the upper end of each link is pivoted to the under portion of an embracing bracket 7, these brackets 7 encircling the tubes 8 and 9 of the device. A trigger 10 is formed from an extension of one of the links 6, and a spring 11 is associated with the trigger and its link and acts to hold the parts in the position they occupy in Fig. 1. By pulling on the trigger, however, the links will be caused to move in an arc of a circle, carrying the brackets 7 and the tubes 8 and 9 with them until the parts occupy the position shown in Fig. 2, or in dotted lines in Fig. 1. In the first position, the curved end 12 of the tube 8, which is adapted to act as a reservoir for the solder strip 13, will be in rear of the iron 3, but in the second position, it will be adjacent the point of the iron which is preferably formed with a hole 14 to receive portion of the solder projecting from the end of the tube. As soon as the finger is removed from the trigger, the spring 11 will return the parts to the rear position, as shown in full lines in Fig. 1.

A rod 15 is slidably mounted in the tube 9 which is below the tube 8 and terminates at a point adjacent the forward bracket 7, and this rod has its forward end projecting from the tube 9 and bent upwardly into a point which passes through a slot 16 formed in the lower portion of the tube 8 and engages the solder strip therein. A leaf-spring 17 acts to hold this pointed end against the solder and also to frictionally hold the solder against backward movement with the plunger rod 15 when said rod is retracted. A knob 18 is fastened to the rear end of the rod 15 and a coiled spring 19 is arranged between the rod and the tube 9, this spring acting to hold the rod in retracted position.

When the device is to be used, the trigger is pulled upon by a finger of the hand of the user grasping the handle 4 so as to move the parts from the position shown in full lines in Fig. 1 to those shown in dotted lines on Fig. 1. This will place the parts in operative position. Then the knob 18 is pressed upon so as to cause the plunger rod 15 to feed the strip of solder in the tube 8 so that the tip of the strip will be placed against the iron where it will be melted. When the knob is released, the spring 19 will retract the plunger rod 15 so that the parts will be in position again to feed the strip forwardly when the knob is pressed upon. The spring 17 will prevent rearward movement of the solder strip on the rearward movement of the plunger rod.

If the iron is provided with the tapered hole 14 which extends from one tapered face of the iron through another face thereof, the solder will pass into the hole, which will act as a reservoir for the melted solder; and where it is desired to feed solder to the under side of an object, the tube 8 can be extended by means of the nozzle 20, as shown in Fig. 2. This nozzle will feed the solder upwardly through the hole and upon the under surface of an object.

If the device is used with an iron having a hole 14 therein and it is not desired to use said hole, the solder can be placed on a solid face of the iron by loosening the screws of the bracket 1 and giving the brackets a quarter turn, after which the screws are tightened. Then the device will deposit the solder on a solid face of the point of the iron.

From the foregoing, it will be seen that I have produced a device which will facilitate the process of soldering and which will reduce possibility of solder dropping off of the point. It will also act to regulate the amount of solder used and the solder may be applied more smoothly. The solder is supplied as needed without moving the iron and it facilitates the application of solder underneath surfaces. The soldering operation can easily be carried out with one hand.

With this device, pieces of solder do not have to be placed on the object by hand, as is customary with persons not skilled in the use of a soldering iron. It will also prevent solder from dropping off the object to be soldered as well as off the point of the iron, as it is customary to first melt small pieces from the strip of solder and place a piece on the spot where the solder is to be applied, and when the point of the hot iron is applied to this piece, the piece is usually knocked off and the whole operation has to be repeated.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a soldering iron, links pivotally connected therewith, a reservoir tube for containing solder, means for pivotally connecting the tube with the links, and a trigger connected with one of the links for permitting the tube to be swung forwardly to place the solder carried by the tube against the iron.

2. In combination with a soldering iron, a reservoir tube for containing solder, a plunger member manually operated for feeding the solder through the tube, means for movably connecting the tube and plunger to a part of the iron, and trigger means for moving the parts forwardly to place the solder on the iron.

3. In combination with a soldering iron, a reservoir tube for containing solder, a plunger member manually operated for feeding the solder through the tube, means for movably connecting the tube and plunger to a part of the iron, trigger means for moving the parts forwardly to place the solder on the iron, and a spring for normally holding the parts in retracted position.

4. In combination with a soldering iron, a reservoir tube for containing solder, a plunger member manually operated for feeding the solder through the tube, means for movably connecting the tube and plunger to a part of the iron, trigger means for moving the parts forwardly to place the solder on the iron, a spring for normally holding the parts in retracted position, said iron having a hole therein into which the solder is deposited by pressing on the said plunger member.

5. In combination with a soldering iron, a reservoir tube for containing solder, a plunger member manually operated for feeding the solder through the tube, means for movably connecting the tube and plunger to a part of the iron, trigger means for moving the parts forwardly to place the solder on the iron, a spring for normally holding the parts in retracted position, said iron having a hole therein into which the solder is deposited on the forward movement of the plunger, and an extension nozzle for the outlet end of the tube for entering the hole and depositing the solder on the under side of an object without solder dropping out of the hole.

6. In combination with a soldering iron, brackets adjustably mounted on the stem thereof, means for holding the brackets in adjusted position on the stem, a pair of tubes, one of which has a curved forward end and acts as a reservoir for a solder strip, brackets connected with the tubes, links connecting the two sets of brackets together, a trigger associated with one link for throwing the links and the tubes forwardly to place the end of the solder tube adjacent the iron, spring means for normally holding the parts in retracted position, a spring plunger carried by the second tube and having a pointed end engaging the solder strip to feed the same forwardly, spring means for holding the pointed end against the strip and to frictionally hold the strip against movement, and the iron having a hole therein for receiving the solder when the brackets are in one position.

In testimony whereof I affix my signature.

PETER H. ROGNLEY.